June 30, 1964     J. J. BYLO     3,139,197
STRUCTURE FOR LOADING AND UNLOADING CARGO
Filed April 23, 1962     2 Sheets-Sheet 1
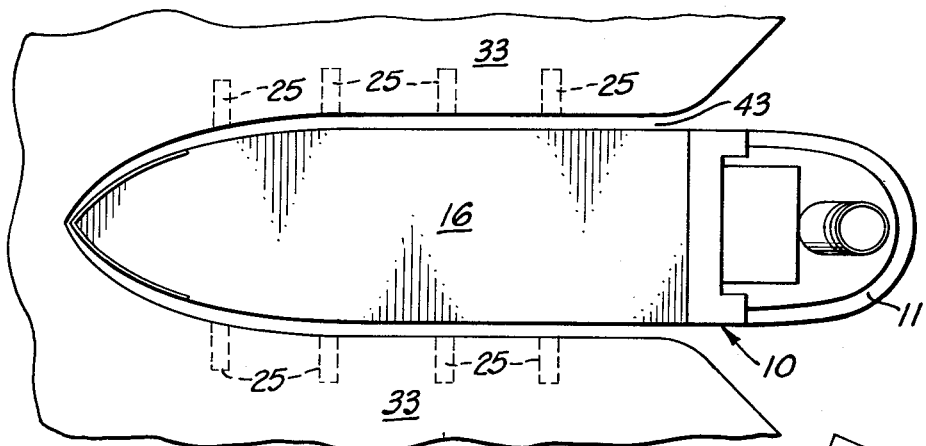
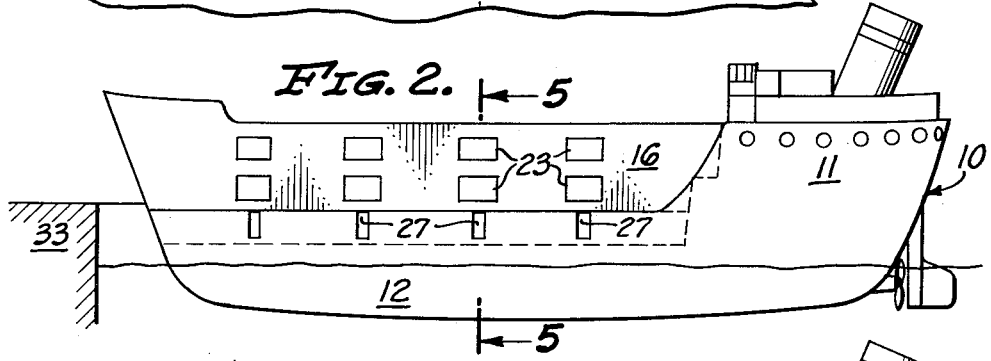
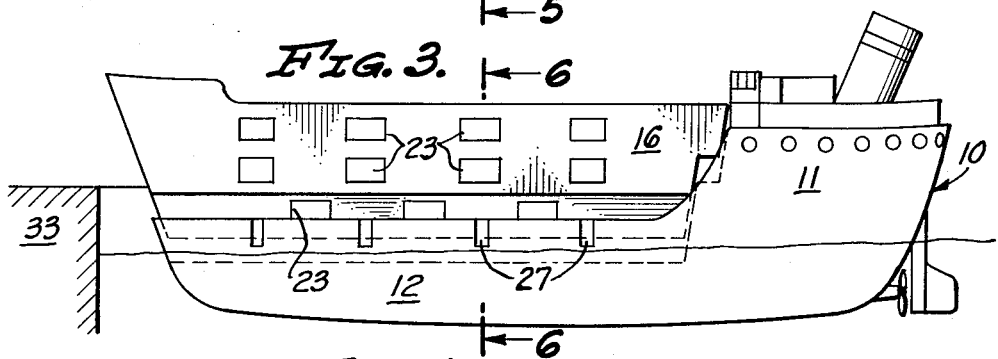
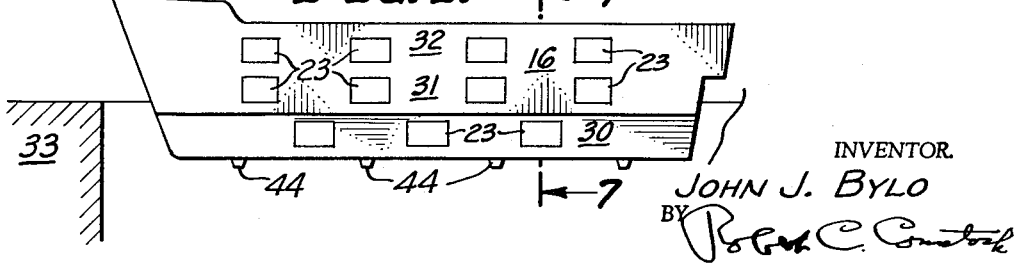
INVENTOR.
JOHN J. BYLO
BY
ATTORNEY June 30, 1964 J. J. BYLO 3,139,197
STRUCTURE FOR LOADING AND UNLOADING CARGO
Filed April 23, 1962 2 Sheets-Sheet 2
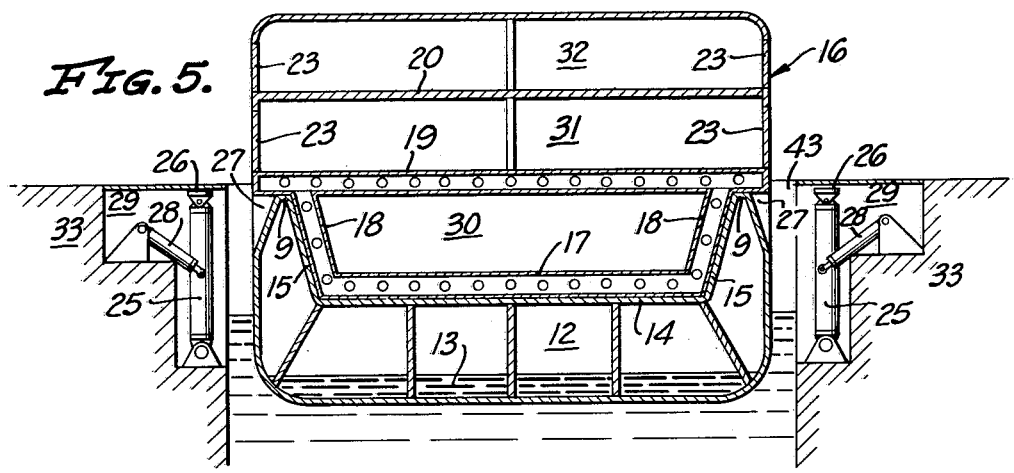
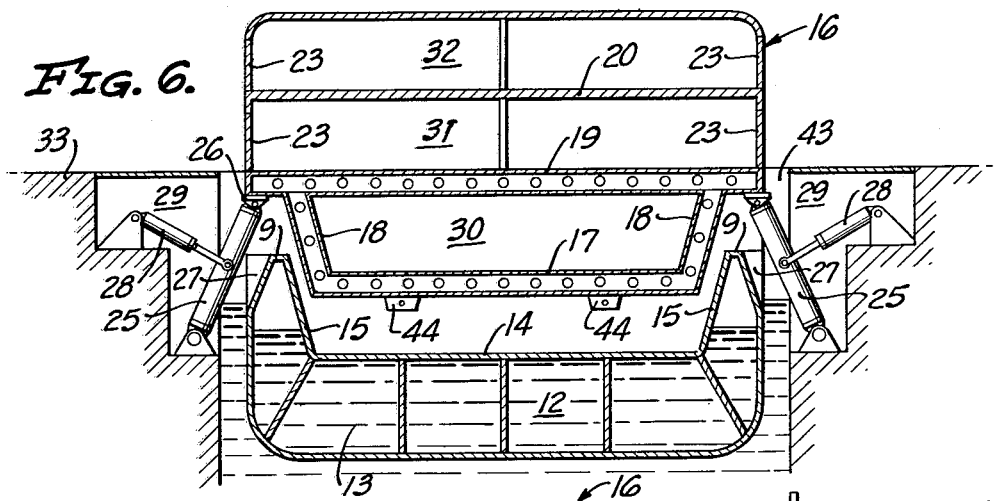
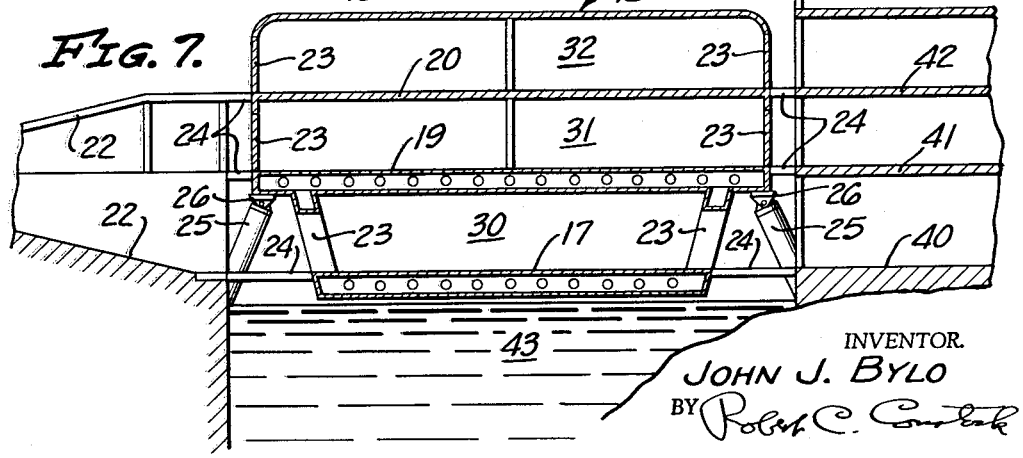
INVENTOR.
JOHN J. BYLO
BY
ATTORNEY

United States Patent Office 3,139,197
Patented June 30, 1964

3,139,197
STRUCTURE FOR LOADING AND UNLOADING
CARGO
John J. Bylo, 7272 Willoughby Ave., Los Angeles, Calif.
Filed Apr. 23, 1962, Ser. No. 189,395
2 Claims. (Cl. 214—12)

This invention relates to a structure for loading and unloading cargo. The present invention is an improvement upon the method and structure described in my prior Patent No. 2,371,149 issued March 13, 1945.

It is an object of my invention to provide a structure for loading and unloading cargo constituting an improvement over the method and structure shown in my prior patent in many particulars. Among the principal advantages of my new structure is that the ship is more stable at sea, due to a considerably lower center of gravity. There is a greater integration of the cargo holder portion and the ship's hull, due to the complementary or mating configuration of the cargo holder and ship. The hold of the ship's hull upon the cargo holder is also increased, due to the mating configuration. The present structure also provides increased lifting power and an increased lifting range for the ship with respect to the cargo holder.

The present structure is also more advantageous in that the cargo holder itself is adapted to be used as a warehouse for the cargo while it is awaiting shipment, thus eliminating one full step in the cargo handling process. With my new structure, it is also possible to use more efficient cargo handling equipment such as that commonly used in warehouses, including pallets, fork lifts, tractors, conveyors, chutes, monorails, etc. This results in a substantial saving in the cost of loading and unloading the cargo, as opposed to the more expensive lifting methods now in use. The cargo holder of the present invention also permits loading of the cargo on the same level as the dock or at most a single level above or below the level of the dock.

The present invention is also adapted for use with either the lift-on, lift-off method in which wheels are removed from mobile equipment such as trucks and the like, to save cargo space or with the roll-on, roll-off method which is favored by the military in which the wheels remain on mobile military equipment such as jeeps, artillery, trucks, etc. so that they are ready for immediate use.

The construction of the ship's hull and its relationship with respect to the cargo adapt my invention for the use of atomic energy as a source of power for the ship.

My invention also contemplates such other objects, advantages and capabilities as will later more fully appear and which are inherently possessed by my invention.

While I have shown in the acompanying drawings preferred embodiments of my invention, it should be understood that the same are susceptible of modification and change without departing from the spirit of my invention.

Referring to the drawings, FIG. 1 is a top plan view of my cargo holder mounted on a ship in a dock with the dock sills engaging the cargo holder;

FIG. 2 is a side elevational view of the cargo holder and ship, with the dock structure broken away;

FIG. 3 is a view similar to FIG. 2, showing separation of the cargo holder from the ship by the lowering of the ship in the water;

FIG. 4 is a view similar to FIGS. 2 and 3, showing the cargo holder after the ship has been separated and has left the dock;

FIG. 5 is a sectional view taken on line 5—5 of FIG. 2;

FIG. 6 is a sectional view taken on line 6—6 of FIG. 3;

FIG. 7 is a sectional view taken on line 7—7 of FIG. 4, showing on opposite sides two different methods and structures for loading the cargo holder.

A preferred embodiment which has been selected to illustrate my invention comprises a ship 10 having at its stern the necessary motive power, control means, crew quarters, etc. generally designated as 11. The entire remainder of the ship forward therefrom comprises a substantially lower cargo holder receiving portion 12, which is substantially U-shaped in cross-section, as best shown in FIGS. 5 and 6 of the drawings. The cargo holder receiving portion 12 is adapted to removably receive and hold a quantity of water 13, which may be increased or decreased as desired by conventional pumping means (not shown).

The cargo holder receiving portion 12 is defined on the outside by the bottom and sides of the ship and on the inside by a base 14 which extends parallel to the bottom of the ship and a pair of side walls 15, which extend diagonally upwardly and outwardly from the opposite ends of the base 14. The side walls 15 may extend in a straight line or may converge at the prow of the ship. Short top walls 9 extend from the upper ends of the side walls 15 to the sides of the ship, except where they are shortened to provide dock sill receiving recesses as described hereinafter.

A cargo holder 16 is preferably provided with three cargo receiving holds. The bottom hold 30 is defined by a bottom deck 17 and a pair of sides 18, which extend diagonally upwardly and outwardly from the opposite sides of the bottom deck 17. The configuration of the bottom hold 30 of the cargo holder 16 is substantially U-shaped in cross-section and is complementary in all respects to the configuration of the cargo holder receiving portion 12 of the ship 10, so that the cargo holder 16 is adapted to be received and securely held within the receiving portion 12 in the manner best shown in FIG. 5 of the drawings.

The cargo holder 16 includes a center hold 31 having a center deck 19 and a top hold 32 having a top deck 20. The bottom deck 17, sides 18 and center deck 19 of the cargo holder 16 are preferably structurally reinforced in any suitable conventional manner, as indicated by the drawings, to increase their strength.

As shown in FIGS. 2–4 of the drawings, the sides of the cargo holder 16 are provided with a plurality of ports 23, through which cargo is loaded. As shown on the right-hand side of FIG. 7, the cargo can be loaded on the same level as the three decks of the cargo holder 16 by aligning the decks 17, 19 and 20 of the cargo holder 16 with the three dockside levels 40, 41 and 42. As shown on the left-hand side of FIG. 7, the cargo may also be loaded by aligning the second deck 19 of the cargo holder 16 with the level of the dock 33 and directing ramps 22 upwardly and downwardly one level to the bottom deck 17 and top deck 20 of the cargo holder 16. In either method, a plurality of removable loading ramps 24 extend between the cargo holder 16 and the dock 33.

It will thus be noted that the relationship between the cargo holder 16 and the dock 33 is such that cargo handling equipment of the type conventionally used in warehouses can be used to load cargo directly on the cargo holder 16. It will also be noted that the present method and structure eliminate the necessity of a dockside warehouse or transit shed. None of the cargo need be lifted into the air and lowered into hatches, as is commonly done now in loading cargo on ships.

The cargo holder 16 is separated from or mounted upon the ship 10 through the use of a plurality of pivotally mounted dock sills 25, which are mounted on the dock alongside the ship 10 and cargo holder 16. Each of the dock sills 25 is pivotally attached at its lower end to the dock, while its upper end carries a pivotable plate 26, which is adapted to engage the portion of the second deck 19 of the cargo holder 16 which extends outwardly beyond the diagonal side 18. The sides of the ship 10 are provided with inwardly directed recesses 27 for this purpose.

Movement of the dock sills 25 between their operating and non-operating positions is accomplished by means of a plurality of hydraulic rams 28, one end of each ram 28 being attached to the midportion of the adjacent dock sill 25. The other ends of the rams 28 are attached to the dock 33. Operation of the rams 28 through suitable conventional solenoid valve controls (not shown) results in the projection or retraction of the ram pistons to cause the dock sills 25 to move between their operating and non-operating positions.

In their non-operating positions, the dock sills 25 are disposed entirely within open housings 29 in the sides of the dock 33. In their operating positions, the dock sills 25 extend diagonally outwardly from the dock 33 into the recesses 27, with their plates 26 engaging the bottom outer edges of the second deck 19 of the cargo holder 16. The alternative positions of the dock sills 25 are shown in FIGS. 5 and 6 of the drawings.

The method of operation in mounting the cargo holder 16 upon the ship 10 and removing it therefrom is based upon the same theory as that disclosed in my prior Patent No. 2,371,149.

The cargo holder 16 is supported during the loading of cargo by the dock sills 25 in the manner shown in FIG. 7 of the drawings. The cargo holder 16 is mounted within a slip 43 above the water level and alongside the dock 33. The cargo holder 16 functions as an assembly and distribution warehouse or area during the cargo handling operation, both while in transit and while at the dock.

When the cargo holder 16 is fully loaded, a ship 10 is brought into the slip with its cargo holder receiving portion 12 substantially full of water 13, so that the bottom of the ship 10 is relatively low compared to the water level of the slip 43. The ship 10 is then held in a substantially stationary position beneath the cargo holder 16 while some of the water 13 is removed from the ship 10. As the water 13 is removed, the ship 10 rises until its cargo holder receiving portion 12 receives and engages the lower deck of the cargo holder 16 in the manner shown in FIG. 5 of the drawings. The dock sills 25 are then retracted and the ship is ready to sail. The water 13 may or may not be replaced in the ship 10, as desired by the ship's master, as required for stability and trim and as sea and load conditions require.

It will be noted that the ship itself is engaged in the loading operation for only a very short time, as compared with the conventional loading time of cargo carrying vessels, which customarily spend as much or more time in port loading and unloading cargo as they spend at sea.

When the ship reaches its destination, the unloading process is substantially the reverse of that described. The ship enters a slip 43. The buoyancy of the ship 10 is increased or decreased, depending upon the water level in the slip 43 to position the ship 10 so that dock sills 25 may be swung into operating position in the recesses 27. Water 13 is then added to the ship 10 to lower it until the relative vertical positions of the ship 10 and cargo holder 16 are such that the ship 10 can be moved out of the slip 43 beneath the cargo holder 16. The ship 10 is then moved to another slip 43, where it takes on another cargo holder 16. The turn-around time of the ship in any given port can thus be reduced to a matter of hours rather than days or weeks.

It is also possible to speed up the turn-around time of ocean going ships even further by utilizing what may be termed transit slips adjacent to the harbor entrance. A seagoing vessel can discharge its cargo holder and take on a new one in such transit slips, thus avoiding the time required to travel the length of the harbor and also avoiding the necessity of tugs, harbor pilots, etc. Movement of the cargo holders within the harbor area can be accomplished by suitably designed harbor ships, which move the cargo holders between the transit slips and the loading slips.

It should be noted that the bottom hold 30 of the cargo holder 16 is substantially narrower in width than the ship 10, so that the lower portion of the cargo holder 16 can nest within the receiving portion 12 of the ship 10. The depth of the bottom hold 30 corresponds to the depth of the receiving portion 12, so that the entire bottom hold 30 is enclosed by the receiving portion 12 and the center deck 19 extends across the top of the receiving portion 12 for the entire width of the ship. The ends of the outer edges of the center deck 19 overlie and engage the top walls 9 of the receiving portion 12.

The bottom of the cargo holder 16 may be provided with a plurality of locking members 44 of suitable type and configuration to inter-engage with the bottom of the cargo holder receiving portion 12 for further stability in holding the cargo holder 16 with respect to the ship 10.

It should be understood that the dock 33 may be floating as well as stationary.

I claim:

1. A structure for loading or unloading cargo on a ship, said ship having a cargo holder receiving portion with substantially lower sides than the remainder of said ship, said portion extending for the major part of the length of said ship and across the entire width of said ship, said portion being substantially U-shaped in cross section, said portion being hollow and adapted to removably hold water to raise or lower the height of said ship, a cargo holder having three vertically spaced decks, a plurality of ports on each side of said cargo holder connected with each of said decks, the bottom deck of said cargo holder being formed complementarily to said portion of said ship and adapted to be entirely held therein, the sides of the upper decks of said cargo holder being substantially closed and tapered to form a substantial part of the sides and one end of said ship above said cargo holder receiving portion, said cargo holder having a plurality of spaced recesses extending inwardly from both sides thereof directly beneath the bottom of the center deck, a dock extending along the opposite sides of said ship, holding means for said cargo holder comprising a plurality of substantially vertically directed dock sills disposed along both sides of said dock, each of said dock sills being pivotally secured at its lower end to said dock and having a free upper end, means for moving said dock sills between a retracted position and an operating position in which the free ends of said dock sills are disposed within said recesses to engage the bottom of said center deck and support said cargo holder, and a passageway adapted for use by cargo carrying equipment and extending substantially horizontally from said dock to at least one port of each deck of said cargo holder whereby cargo can be moved directly between said dock and each of the decks of said cargo holder.

2. The structure described in claim 1, each of said dock sills having a pivotable plate mounted on its upper end, a plurality of hydraulic rams, each of said rams having one end thereof secured to one of said dock sills and the other end thereof secured to said dock, said rams being adapted to move said dock sills between a vertical retracted position and an operating position in which they project diagonally outwardly from said dock.

References Cited in the file of this patent
UNITED STATES PATENTS

| | | |
|---|---|---|
| 10,843 | Young | May 2, 1854 |
| 1,076,068 | Schleicher | Oct. 21, 1913 |
| 1,226,055 | Bohn | May 15, 1917 |
| 2,371,149 | Bylo | Mar. 13, 1945 |
| 2,894,650 | Black et al. | July 14, 1959 |